(12) United States Patent
Silver et al.

(10) Patent No.: US 9,558,659 B1
(45) Date of Patent: Jan. 31, 2017

(54) DETERMINING THE STATIONARY STATE OF DETECTED VEHICLES

(71) Applicant: Google Inc., Mountain View, CA (US)

(72) Inventors: David Harrison Silver, Millbrae, CA (US); David Ian Franklin Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 125 days.

(21) Appl. No.: 14/523,253

(22) Filed: Oct. 24, 2014

Related U.S. Application Data

(60) Provisional application No. 62/043,558, filed on Aug. 29, 2014.

(51) Int. Cl.
*B60W 30/00* (2006.01)
*G08G 1/01* (2006.01)

(52) U.S. Cl.
CPC ............ *G08G 1/0125* (2013.01); *B60W 30/00* (2013.01)

(58) Field of Classification Search
CPC .............................. G08G 1/0125; B60W 30/00
USPC .......................................................... 701/23
See application file for complete search history.

(56) References Cited

U.S. PATENT DOCUMENTS

| 8,849,494 B1 * | 9/2014 | Herbach ............... | B60W 30/00 701/24 |
| 2014/0330479 A1 * | 11/2014 | Dolgov ................. | B60W 30/16 701/28 |

FOREIGN PATENT DOCUMENTS

DE         102014011630 A1 *  3/2015  ............. B60R 13/10

* cited by examiner

Primary Examiner — Mussa A Shaawat
Assistant Examiner — Abdhesh Jha
(74) Attorney, Agent, or Firm — Lerner, David, Littenberg, Krumholz & Mentlik, LLP

(57) ABSTRACT

Aspects of the disclosure relate to an autonomous vehicle that may detect other nearby vehicles and designate stationary vehicles as being in one of a short-term stationary state or a long-term stationary state. This determination may be made based on various indicia, including visible indicia displayed by the detected vehicle and traffic control factors relating to the detected vehicle. For example, the autonomous vehicle may identify a detected vehicle as being in a long-term stationary state based on detection of hazard lights being displayed by the detected vehicle, as well as the absence of brake lights being displayed by the detected vehicle. The autonomous vehicle may then base its control strategy on the stationary state of the detected vehicle.

19 Claims, 9 Drawing Sheets

DETERMINING THE STATIONARY STATE OF DETECTED VEHICLES

CROSS-REFERENCES TO RELATED APPLICATIONS

The present application claims the benefit of the filing date of U.S. Provisional Application No. 62/043,558 filed on Aug. 29, 2014, the disclosure of which is hereby incorporated herein by reference.

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions.

BRIEF SUMMARY

One aspect of the disclosure provides a method. The method includes detecting, by one or more computing devices, a first vehicle; identifying, by the one or more computing devices, that the first vehicle is stationary; detecting, by the one or more computing devices, one or more visible indicia relating to the first vehicle; identifying, by the one or more computing devices, one or more traffic control factors relating to the first vehicle; determining, by the one or more computing devices, whether the first vehicle is in a first stationary state or a second stationary state, wherein the determination is based on the one or more visible indicia and the one or more traffic control factors; and controlling, by the one or more computing devices, an autonomous vehicle in accordance with a control strategy based on whether the first vehicle is determined to be in the first stationary state or the second stationary state.

In one example, the first stationary state is a short-term stationary state and the second stationary state is a long-term stationary state. In addition, the one or more visible indicia may include identification of whether the first vehicle is emitting one or more lights. In another example, the first vehicle may be detected as emitting at least one of the following: hazard lights, emergency vehicle lights, and construction warning lights. In addition, the first vehicle may be determined to be in the second stationary state based on the one or more lights. In another example, the visible indicia may be brake lights or a turn signal. The absence of one or more lights may also be a visible indicia.

In another example, the identification of traffic control factors may include detecting that the first vehicle is at a traffic control location that is associated with being temporarily stationary, such as at a traffic light, a stop sign, a yield sign, a caution sign, a crosswalk, or a railroad crossing.

In still another example, the method includes detecting, by the one or more computing devices, that the first vehicle has remained stationary for a predetermined period of time; and changing, by the one or more computing devices, the determination for the first vehicle from the first stationary state to the second stationary state based on the first vehicle having remained stationary for the predetermined period of time.

In yet another example, the first vehicle is at a first type of traffic control location from a plurality of traffic control location types, and wherein the predetermined period of time is based on the traffic control location type. In addition, detecting the one or more indicia may include detecting that the first vehicle is temporarily obstructed from moving by one or more surrounding objects. At least one object of the one or more surrounding objects may not be detected when the determination is made that the first vehicle is in the first stationary state or the second stationary state, and the first vehicle may be determined to be obstructed by the one object based on a previous detection of the one object.

In another aspect of the disclosure, the methods set forth above may be performed by a system that includes an autonomous vehicle and one or more computing devices. The system may also include non-transitory, tangible computer-readable storage medium on which computer readable instructions of a program are stored, the instructions, when executed by one or more processors, cause the one or more processors to perform the disclosed methods.

DETAILED DESCRIPTION

Overview

Figure 1:
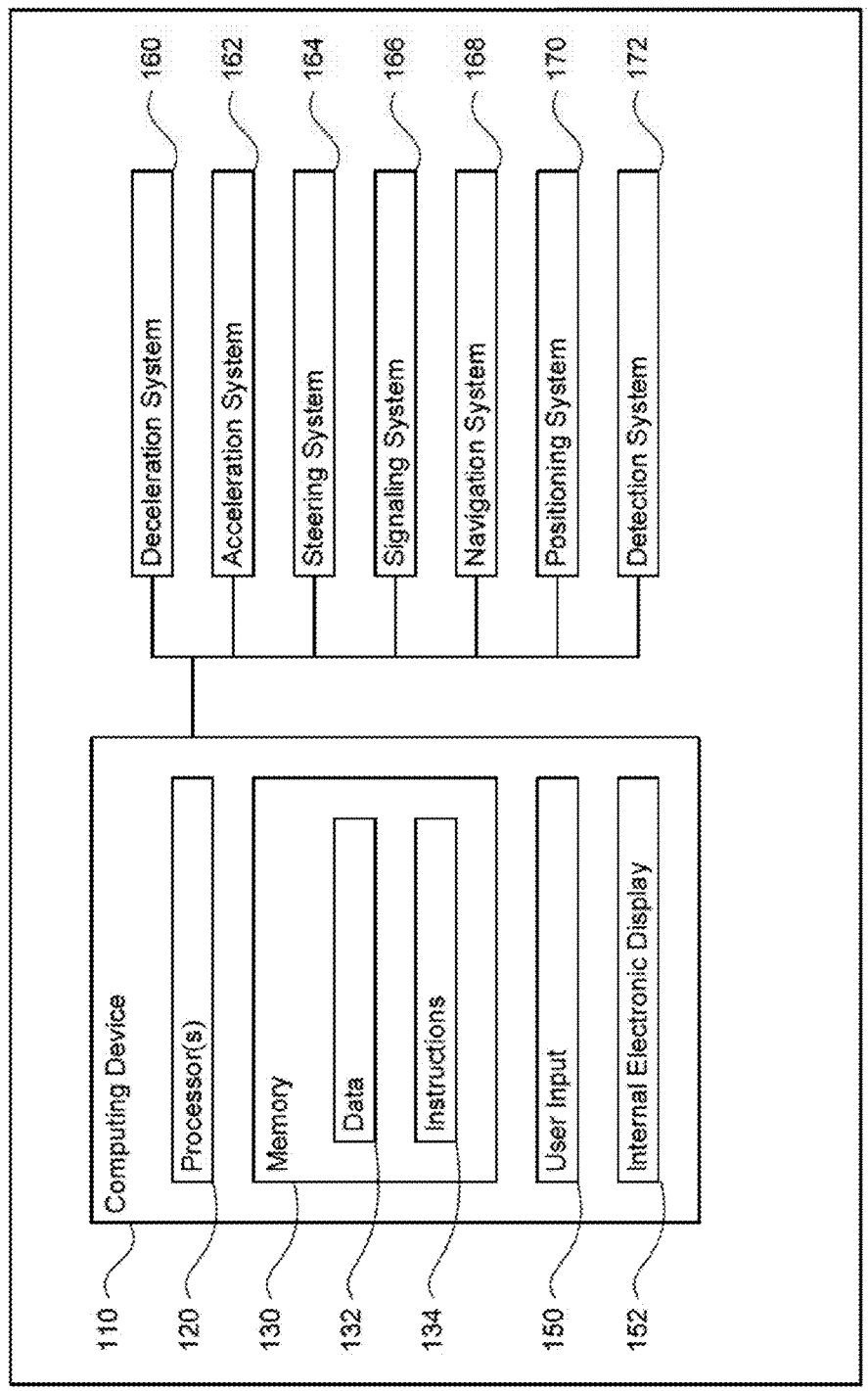
FIG. 1 is a functional diagram of a system in accordance with aspects of the disclosure.

The technology relates to autonomous vehicles that may determine whether a detected stationary vehicle is likely to remain stationary for an extended period time, such as a vehicle that is stalled, parked, or is in the process of being loaded or unloaded. In these situations, the stationary vehicle may be identified as a long-term stationary vehicle, in that the vehicle is unlikely to begin moving with traffic for an extended period of time. In contrast, a vehicle may be identified as a short-term stationary vehicle if it is likely to begin moving soon. For example, a vehicle that is stopped at a stop sign, yield sign, or a traffic light may be a short-term stationary vehicle that will soon begin moving with traffic. Similarly, a vehicle may be identified as a short-term stationary vehicle if it is stopped because of the surrounding traffic or other short-term obstructions. If a stationary vehicle is determined to be long-term stationary, the autonomous vehicle may react to this determination by changing out of the lane of traffic in which the long-term stationary vehicle is located or by otherwise moving around the long-term stationary vehicle.

The autonomous vehicle may detect a stationary vehicle using data from a vehicle tracking system that may include sensors and cameras. The autonomous vehicle may also compare the detected stationary vehicle with map data to determine the detected vehicle's location. For example, the autonomous vehicle may compare the position of the stationary vehicle with map data so as to determine the type of roadway, intersection, or lane of travel in which the stationary vehicle is currently located.

For each stationary vehicle, the autonomous vehicle may access data from the vehicle tracking system to determine whether the vehicle has visible indicia of being a long-term stationary vehicle. For example, the autonomous vehicle may determine if the vehicle is displaying some form of flashing lights, such as hazard lights, emergency vehicle lights, or construction warning lights, which would indicate that the detected vehicle is a long-term stationary vehicle. The autonomous vehicle may also determine if the detected vehicle is a long-term stationary vehicle based on other visible indicia of the detected object. For example, the autonomous vehicle may detect whether a stationary vehicle is displaying brake lights or a turn signal, which would indicate that the stationary vehicle may be moving soon. Similarly, the detected vehicle may be identified as a long-term stationary vehicle if the vehicle is detected as having an open door or trunk.

The vehicle tracking system may also provide data indicating that the detected stationary vehicle is not moving for traffic control reasons. For example, the autonomous vehicle may detect whether there are other objects, such as stopped traffic or pedestrians, that are preventing the detected stationary vehicle from moving. In determining whether other objects are preventing the stationary vehicle from moving, the autonomous vehicle may track whether previously detected objects are currently blocking the stationary vehicle. Similarly, the autonomous vehicle may determine whether the tracking system is being occluded from detected potential obstacles that are blocking the stationary vehicle, thereby giving a false perception that the vehicle is a long-term stationary vehicle. For example, the autonomous vehicle may track a pedestrian walking along a crosswalk, but then lose the ability to detect the pedestrian as he or she walks in front of the stationary vehicle. In this instance, the autonomous vehicle may identify the stationary vehicle as being obstructed from moving forward by the previously detected pedestrian, even though the pedestrian is not currently being detected by the tracking system.

The autonomous vehicle may also determine that the detected stationary vehicle is currently at a location in which the detected vehicle needs to stop, such as at a stop light, stop sign, crosswalk, railroad crossing, or similar locations. In these instances, the stationary vehicle may be identified as a short-term stationary vehicle for at least a period of time. However, the autonomous vehicle may reevaluate the identification of the detected vehicle as a short-term stationary vehicle, if the vehicle remains stationary. For example, a detected vehicle may be identified as a short-term stationary vehicle if it is stopped at a stop sign. However, if the stationary vehicle remains at the stop sign for longer than some predefined period of time, and is not otherwise obstructed from moving, the detected vehicle may then be identified as a long-term stationary vehicle for which the autonomous vehicle should travel around. The period of time before a detected vehicle is identified as a long-term stationary vehicle may depend on the traffic control conditions, as well as the previously detected movement of the detected vehicle. For example, the period of time will be longer when the detected vehicle is located a stop sign than when the detected vehicle is located at a yield sign.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
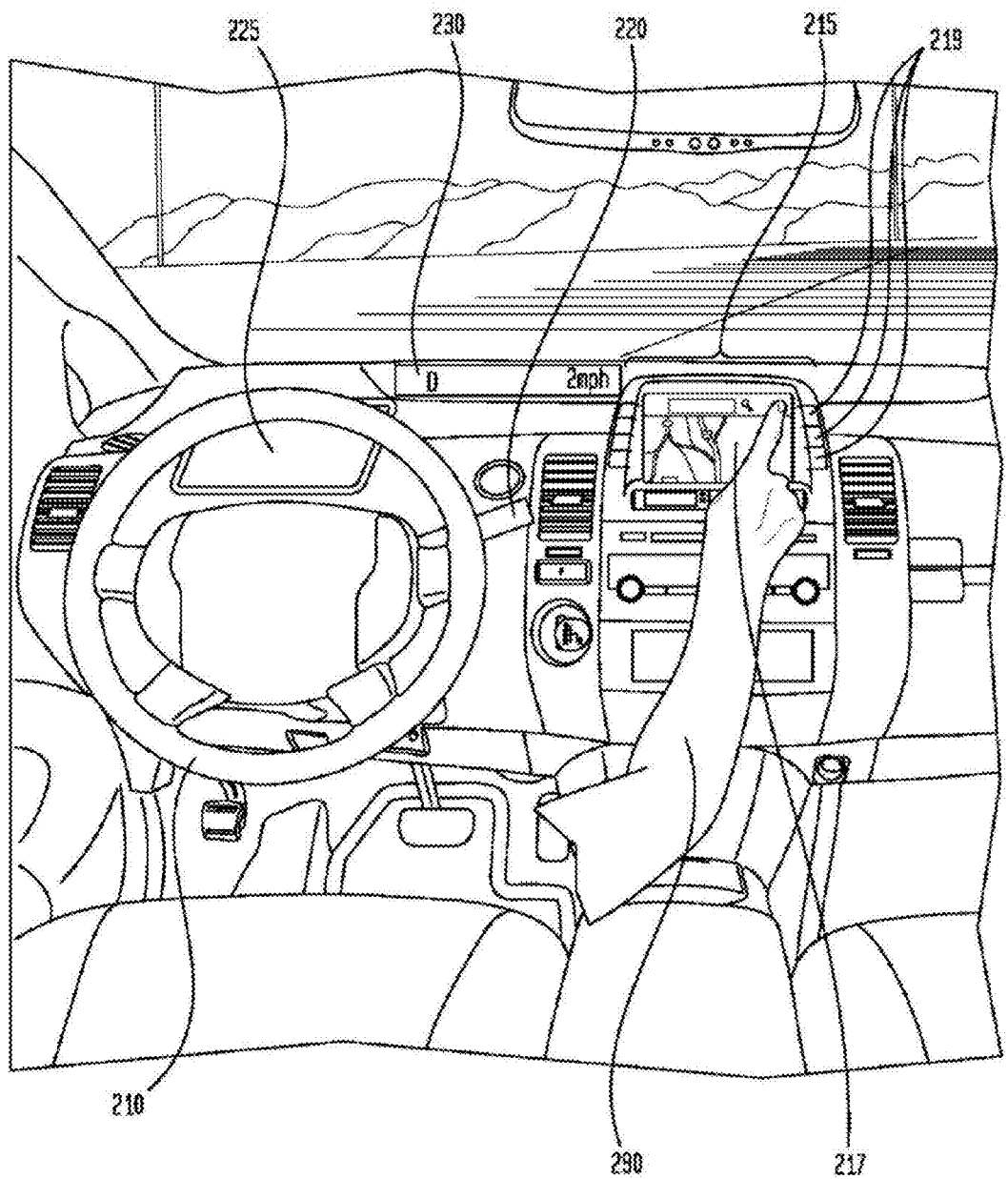
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Figure 3:
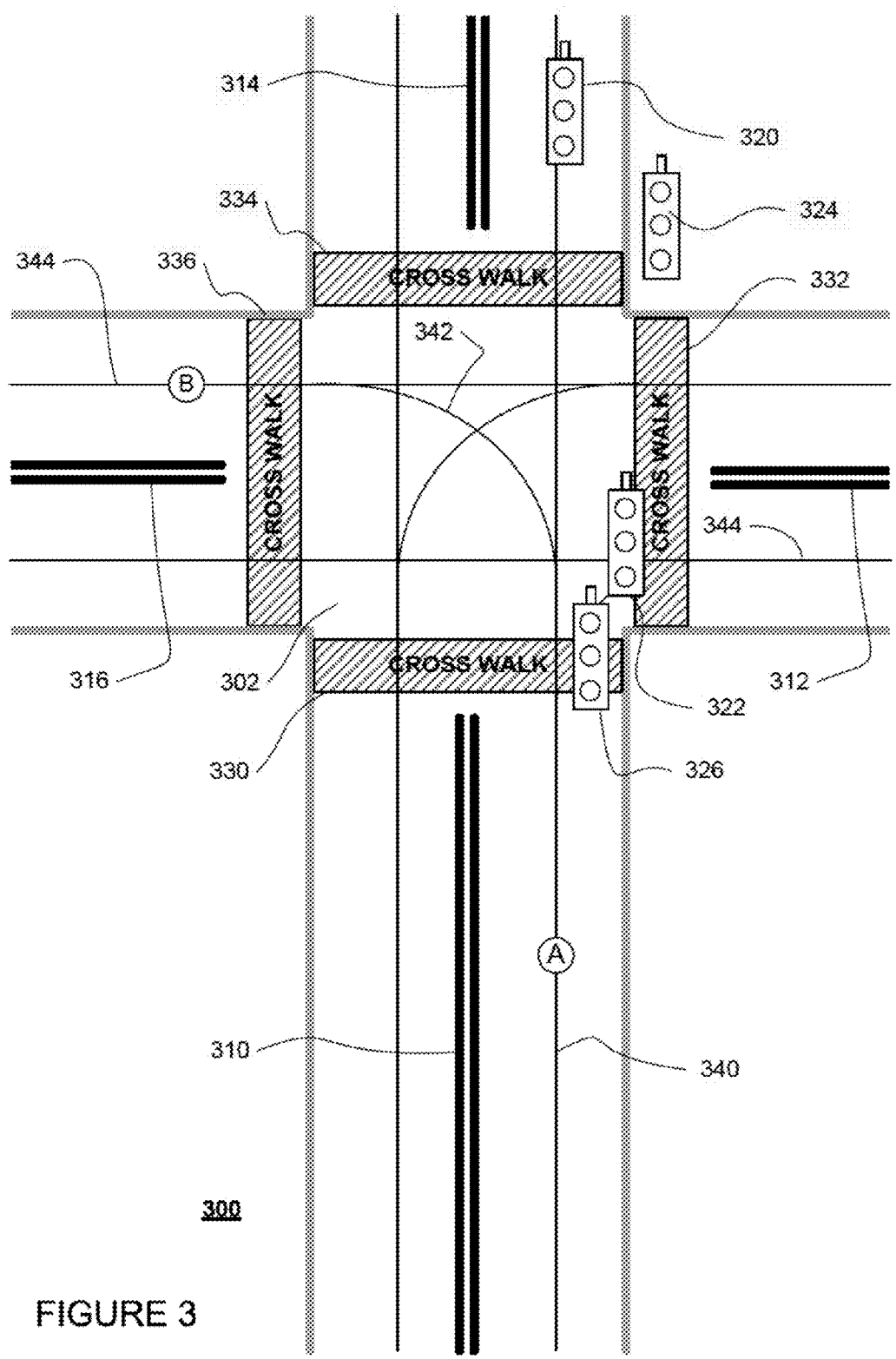
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, 316 traffic signals 320, 322, 324, 326, crosswalks 330, 332, 334, 336. Although the examples herein relate to a simplified three-state traffic signals, other types of traffic signals, such as those for right or left turn only lanes may also be used.

In addition, the detailed map information may include a network of rails, including rails 340, 342, 344, which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 340, transitioning to rail 342, and subsequently transitioning to rail 344 in order to make a left turn at intersection 302.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

Returning to FIG. 1, the positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g., by lighting turn signals of signaling system 166).

Figure 4:
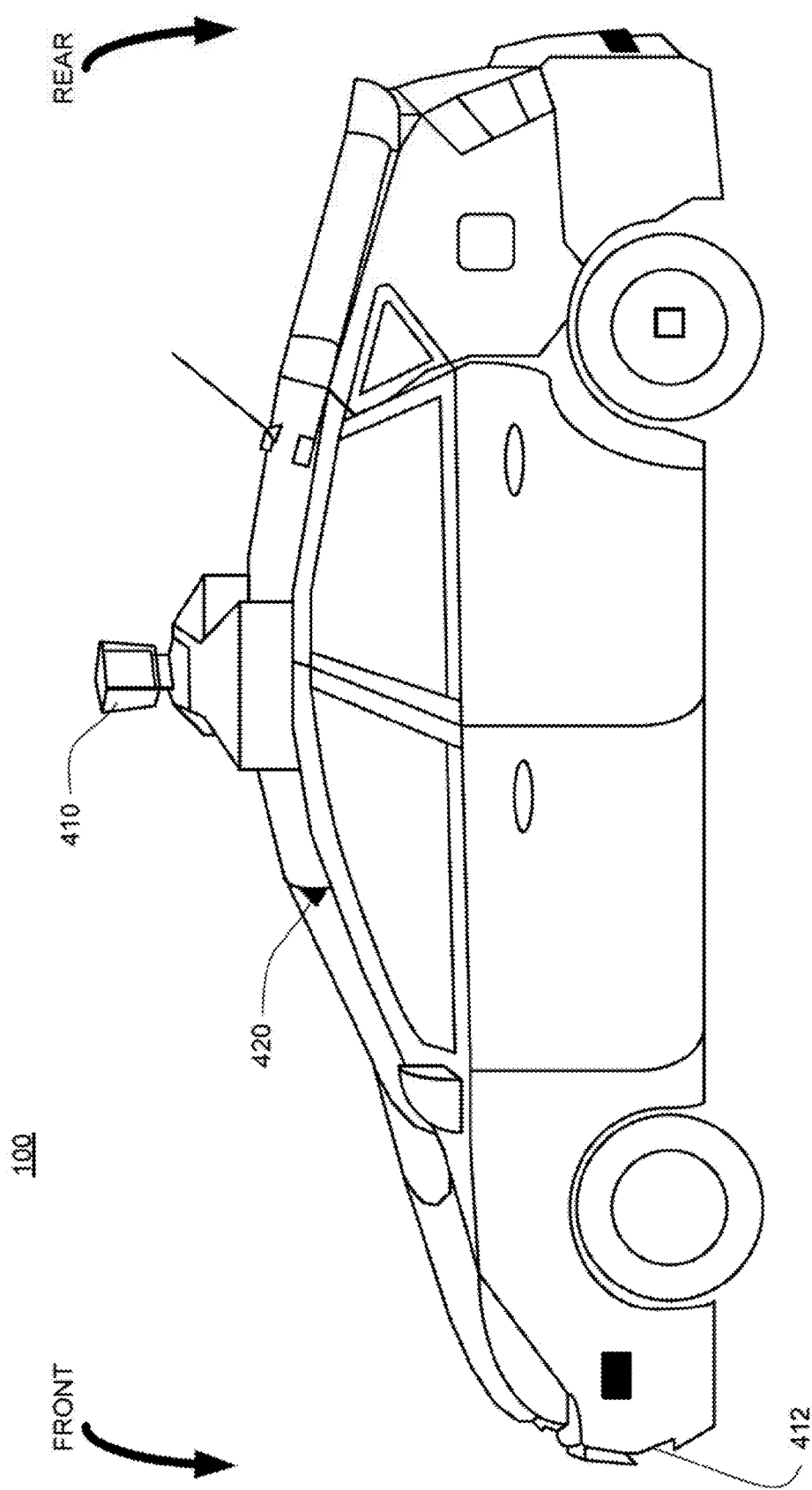
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 410 and 412 may be positioned or mounted on the vehicle. As an example, the one or more computing devices 110 (not shown) may control laser range finder 410, e.g., by rotating it 180 degrees. In addition, the perception system may include one or more cameras 420 mounted internally on the windshield of vehicle 100, or elsewhere, to receive and analyze various images about the environment. Other detection devices, such as sonar, radar, GPS, etc., may also be positioned in a similar manner.

The one or more computing devices 110 may also include features such as transmitters and receivers that allow the one or more devices to send and receive information to and from other devices. For example, the one or more computing devices may determine information about the current status of a traffic signal light as well as information about when the status of the traffic signal light changes (from green to yellow to red to green). The one or more computing devices may send this information to other computing devise associated with other vehicles. Similarly, the one or more computing devices may receive such information from other computing devices. For example, the one or more computing devise may receive information about the current status of a traffic signal light as well as information about when the status of the traffic signal light changes from one or more other computing devices associated with other autonomous or non-autonomous vehicles. As another example, the one or more computing devices may receive such information with devices associated with the traffic signal lights. In this regard, some traffic signal lights may include transmitters that send out information about the current status of a traffic signal light as well as information about when the status of the traffic signal light changes.

This information may be sent and received via any wireless transmission method, such as radio, cellular, Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
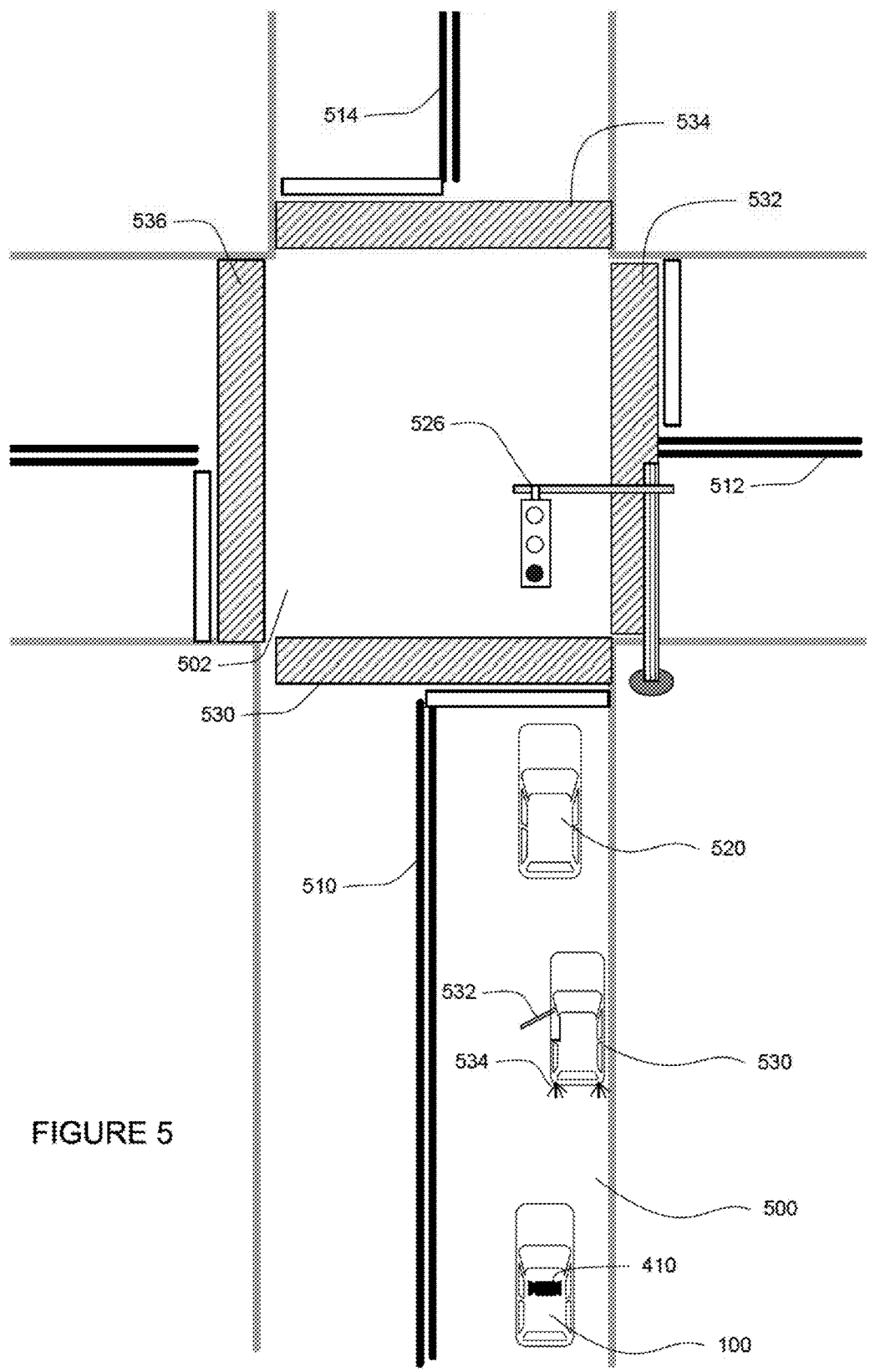
FIG. 5 is an example diagram of a section of roadway including an intersection in accordance with aspects of the disclosure.

As noted above, a vehicle's one or more computing devices may maneuver the vehicle using the various systems described above. For example, FIG. 5 depicts a section of roadway 500 including an intersection 502. Autonomous vehicle 100 is approaching intersection 502 and may be controlled in an autonomous driving mode.

In this example, intersection 502 corresponds to the intersection 302 of the detailed map information 300. In this regard, lane lines 510, 512, and 514 correspond to the shape, location, and other characteristics of lane lines 310, 312, and 314, respectively. Similarly crosswalks 530, 532, 534, and 536 correspond to the shape, location, and other characteristics of crosswalks 330, 332, 334, and 336, respectively and traffic signal 526 corresponds to the shape, location, and other characteristics of traffic signal 326. For simplicity, only a single traffic signal 526 is shown, though other traffic signals corresponding to the shape, location, and other characteristics of traffic signals 320, 322, and 324 may also exist.

Autonomous vehicle 100 may detect surrounding objects and track their movements. In addition, autonomous vehicle 100 may identify whether a particular object is a mobile object, meaning that the object is capable of moving. Autonomous vehicle 100 may also identify whether a mobile object is currently stationary. For example, autonomous vehicle 100 may use laser range finder 410, as well as other sensors and cameras, to detect vehicles 520 and 530, to identify those vehicles as automobiles, and to determine that the vehicles 520 and 530 are currently stationary.

In accordance with one aspect of the disclosure, autonomous vehicle 100 may also determine the type of stationary state of the detected mobile objects. For example, autonomous vehicle 100 may identify vehicles 520 and 530 as being automobiles that are in either a short-term stationary state or a long-term stationary state. In accordance with one aspect, the short-term stationary state may indicate that the object will likely soon begin moving with traffic, while the long-term stationary state may indicate that the automobile will likely not begin moving with traffic in the near future.

In determining the type of stationary state for a particular object, autonomous vehicle 100 may determine whether the object is detected to have one or more visible indicia associated with a particular type of stationary state. For example, as autonomous vehicle 100 approaches vehicle 530, it may detect, using one or more of the sensors or cameras described above, that door 532 of vehicle 530 is currently open. In addition, autonomous vehicle 100 may detect that hazard lights 534 of vehicle 530 are flashing. Based on these visible indicia, autonomous vehicle 100 may determine that vehicle 530 is in a long-term stationary state, and that vehicle 530 is unlikely to begin moving with traffic in the short-term.

Autonomous vehicle 100 may use any number of visible indicia to determine the type of stationary state for a vehicle.

In addition to hazard lights, other lights may be detected and identified, such as emergency vehicle lights, construction warning lights, turn signals, brake lights, and reverse lights. Emergency vehicle lights or construction warning lights may indicate that a vehicle is in a long-term stationary state. In contrast, brake lights, reverse lights, and turn signals may indicate that a vehicle is in a short-term stationary state, depending on the context in which the lights are being displayed. Autonomous vehicle may also detect the absence of various indicia. For example, the absence of brake lights in a stationary vehicle may indicate that the vehicle is in a long-term stationary state. As discussed above, autonomous vehicle may also detect whether a detected vehicle has an open trunk, hood, or door. Similarly, a truck with an open cargo hold may be used as an indication that the truck is in a long-term stationary state. These indicia may then be used to determine that the detected vehicle is in a long-term stationary state.

Figure 6:
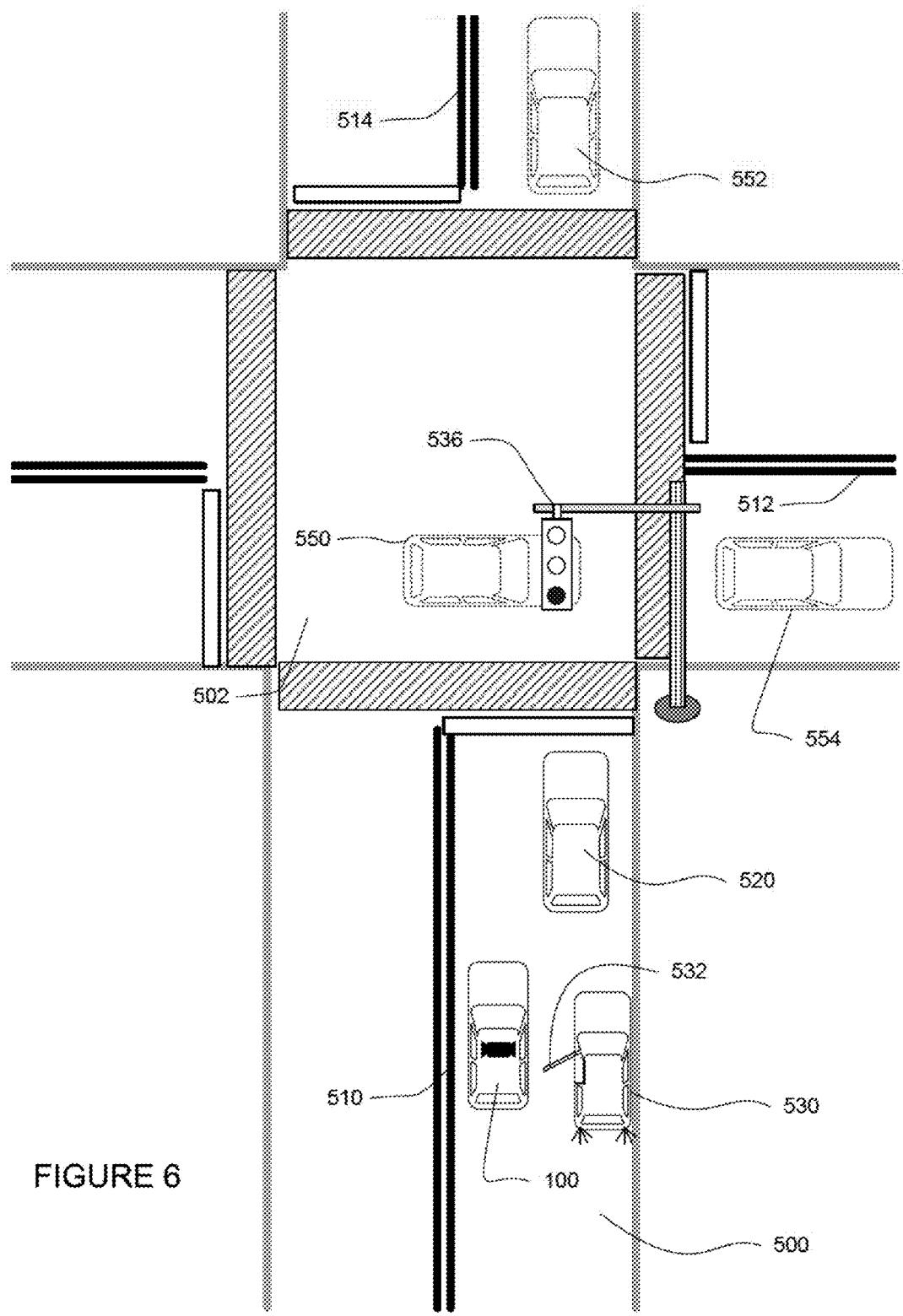
FIG. 6 is another example diagram of a section of roadway including an intersection in accordance with aspects of the disclosure.

In response to determining that vehicle 530 is in a long-term stationary state, autonomous vehicle 100 may alter the control strategy under which it is currently operating. For example, if vehicle 530 was determined to be in a short-term stationary state, autonomous vehicle 100 may pull behind vehicle 530 and wait for the vehicle to begin moving with traffic. However, given that vehicle 530 is determined to be in a long-term stationary state, autonomous vehicle 100 may instead determine whether there is a way to safely maneuver around vehicle 530, so as to continue travelling to a desired destination. For example, as shown in FIG. 6, autonomous vehicle 100 may determine that the distance between lane line 510 and the door 532 of vehicle 530 is large enough that autonomous vehicle 100 may proceed around vehicle 530 and continue to travel along roadway 500.

In determining the type of stationary state for a particular object, autonomous vehicle 100 may also compare the detected object's current position with available map data. Accordingly, autonomous vehicle may determine the type of roadway, intersection, lane of travel, or other traffic pattern in which the detected object is currently positioned. This information may then be used as further evidence that vehicle 530 is in a long-term stationary state.

Autonomous vehicle 100 may also determine whether a detected vehicle is currently at a location in which the detected vehicle is required to temporarily stop, such as at a stop light, yield sign, stop sign, crosswalk, or railroad crossing. For example, as autonomous vehicle 100 approaches intersection 502, it may determine that vehicle 520 is currently stationary and that vehicle 520 is positioned just outside of intersection 502. Autonomous vehicle 100 may also determine the type of stationary state that vehicle 520 is in based, at least in part, on the type of intersection at which vehicle 520 is located. In particular, autonomous vehicle 100 may identify that the intersection 502 at the location of vehicle 520 is controlled by traffic light 536. Autonomous vehicle 100 may therefore use the current state of traffic light 536 in determining the type of stationary state for vehicle 520. If autonomous vehicle 100 detects that traffic light 536 is currently showing a red light, vehicle 520 may be determined to be in a short-term stationary state. This state however may be updated as autonomous vehicle 100 acquires additional information through one or more sensors and cameras. For example, if traffic light 536 turns green and vehicle 520 remains stationary for some predetermined length of time, autonomous vehicle 100 may update the designation of vehicle 520 to a long-term stationary state. The length of time for which a vehicle is detected to remain stationary before it is designated as being in a long-term stationary state may depend on the type of traffic pattern in which it is currently positioned, as well as any visible indicia that the object is displaying. For example, a vehicle that has not moved from an intersection with a stop sign may be designated as being in a long-term stationary state after it has not been observed as moving at any point and it has remained stationary for 15 seconds. In another example, a detected vehicle may be determined to be in a long-term stationary state after a few seconds, if the detected vehicle is located at an intersection in which the detected vehicle has the right-of-way, such as when there is no stop sign associated with the detected vehicle's lane of traffic.

Autonomous vehicle 100 may also determine whether a detected vehicle is not moving because of other traffic control reasons, such as by being blocked from moving because of an obstruction. In particular, if a detected vehicle is sitting in traffic, with other cars located directly in front of it, autonomous vehicle 100 may designate the detected vehicle as being in a short-term stationary state, unless additional indicia provide sufficient evidence that the detected vehicle is actually in a long-term stationary state. For example, as autonomous vehicle 100 approaches vehicle 520, it may determine whether other objects, such as other vehicles or pedestrians, are currently blocking vehicle 520 from moving.

The outlines of vehicles 550, 552, and 554 provide various examples in which potential vehicles may be identified as blocking the movement of vehicle 520. In particular, if autonomous vehicle 100 detects that a vehicle 550 is positioned in the manner shown in FIG. 6, autonomous vehicle 520 may continue to designate vehicle 520 as being in a short-term stationary state, even if vehicle 520 does not begin to move for a predetermined time period after traffic light 536 has turned green. Autonomous vehicle may also compare other surrounding vehicles with the available map data to determine if they are blocking a detected vehicle from moving, even if the surrounding vehicles are not directly in front of or next to the detected vehicle. For example, autonomous vehicle 100 may identify a vehicle at the position of vehicle 552 as blocking vehicle 520 from legally proceeding into intersection 502. Accordingly, autonomous vehicle 100 may continue to designate vehicle 520 as being in a short-term stationary state, as long as vehicle 552 remains at that position.

In yet another example, autonomous vehicle 100 may detect that vehicle 520 has its right-hand turn signal on, thereby indicating that vehicle 520 is likely to turn right at the intersection. If autonomous vehicle 100 detects a vehicle at the position of vehicle 554, it may identify vehicle 554 as blocking vehicle 520 from moving. Accordingly, autonomous vehicle 100 may continue to designate vehicle 520 as being in a short-term stationary state, as long as vehicle 554 remains at or near that location.

Autonomous vehicle 100 may also identify instances where its sensors and cameras are being occluded from currently detecting obstacles that are preventing a detected vehicle from moving. For example, autonomous vehicle 100 may track a pedestrian as he or she walks in front of a stationary vehicle. Autonomous vehicle 100 may identify the stationary vehicle as being obstructed from moving forward by the previously detected pedestrian, even though the pedestrian is not currently being detected by the sensors and cameras of the autonomous vehicle 100.

Figure 7:
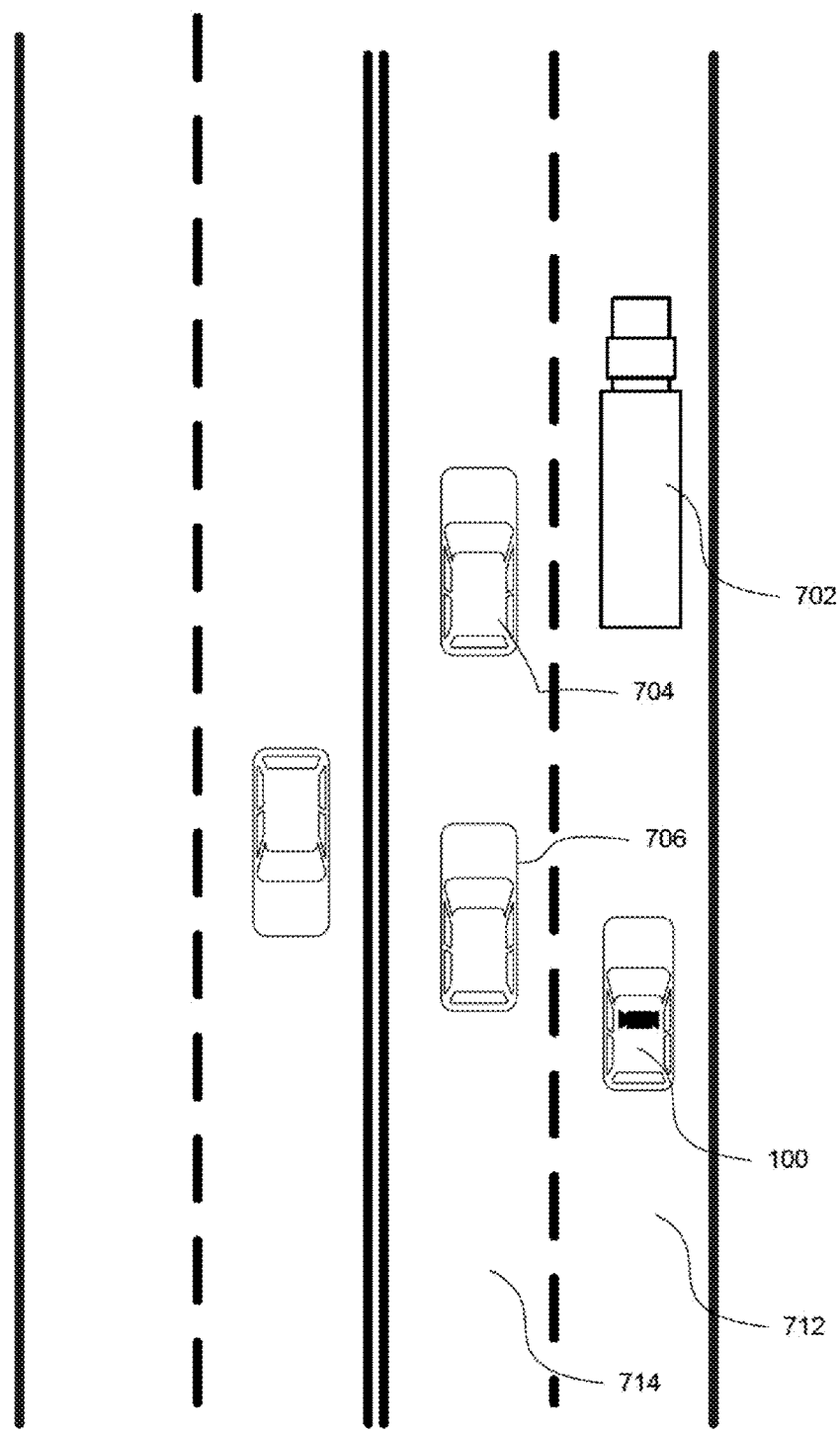
FIG. 7 is another example diagram of a section of roadway in accordance with aspects of the disclosure.

Autonomous vehicle 100 may also identify instances where autonomous vehicle 100 has no information about the area in front of or around a detected vehicle, such as when the detected vehicle is large. For example in FIG. 7, autonomous vehicle 100 is approaching stationary tractor-trailer 702 in lane 712, however autonomous vehicle 100 is not able to detect whether there are any obstructions blocking tractor-trailer 702 from moving. Autonomous vehicle 100 may therefore identify that it requires additional information to determine whether tractor-trailer 702 is in a long-term or short-term stationary state. In some instances, autonomous vehicle 100 may look to other lanes of traffic to determine whether tractor-trailer is likely being blocked by an obstruction. For example, autonomous vehicle 100 may track vehicles 704 and 706 as they travel in lane 714. If vehicles 704 and 706 are also stationary, or moving very slowly, then autonomous vehicle 100 may determine that tractor-trailer 702 is likely being blocked from moving due to a traffic obstruction. Tractor-trailer 702 may therefore be designated as being in a short-term stationary state. In this instance, autonomous vehicle may remain in lane 712 under its current control strategy. However, if vehicles 704 and 706 are moving within lane 714, autonomous vehicle 100 may designate tractor-trailer 702 as being in a long-term stationary state. Autonomous vehicle 100 may then alter its control strategy so as to change from lane 712 to lane 714.

Figure 8:
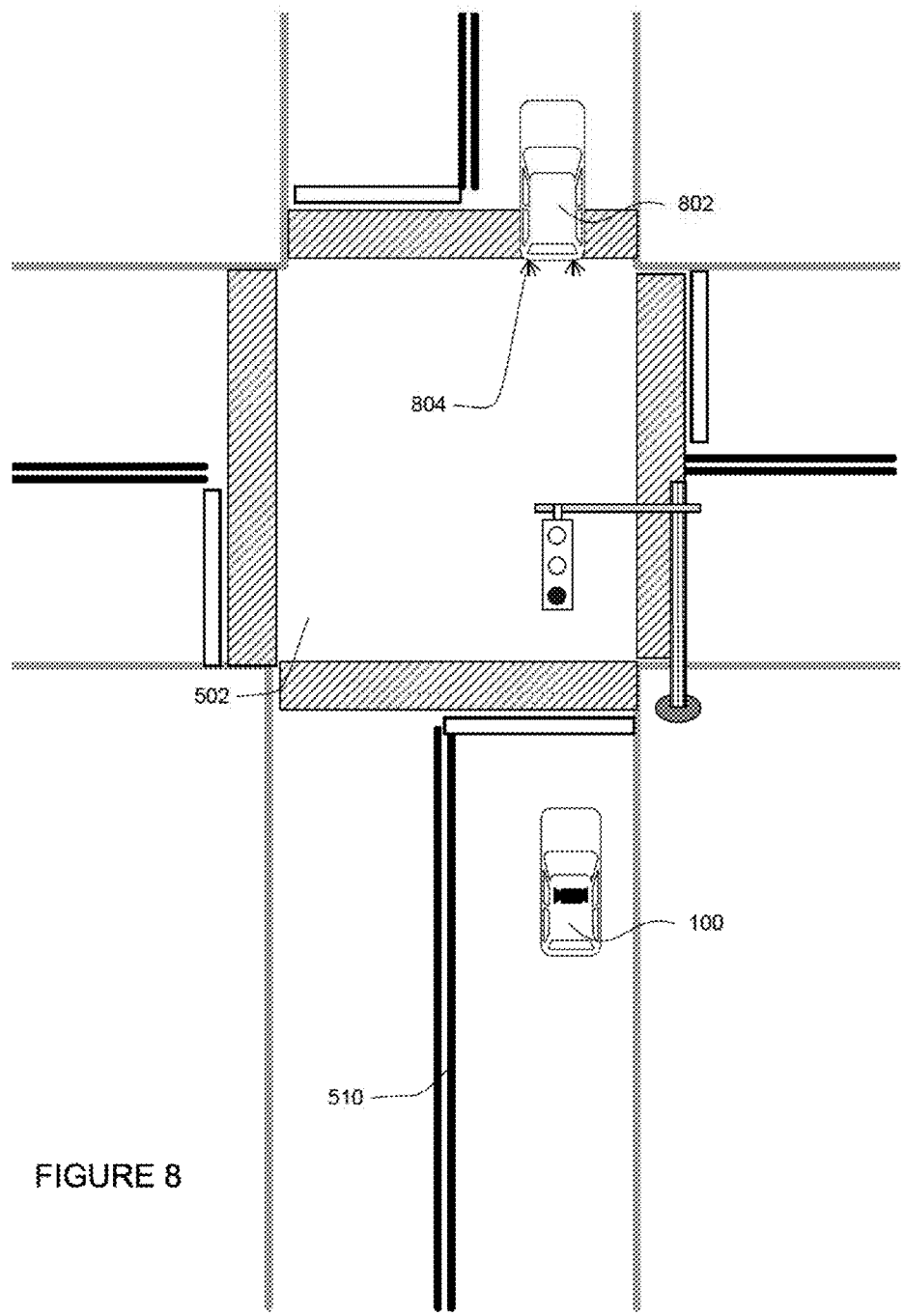
FIG. 8 is another example diagram of a section of roadway including an intersection in accordance with aspects of the disclosure.

In addition to changing lanes, autonomous vehicle may also react to long-term stationary vehicles by calculating a different route to its destination. For example, in FIG. 8, vehicle 802 is broken down just outside of intersection 502 with its hazard lights 804 activated. Autonomous vehicle 100 approaches intersection 502 as it travels along a pre-determined route that would take it straight through intersection 502. However, as it approaches intersection 502, autonomous vehicle 100 may detect vehicle 802 and its hazard lights 804. Based on the visible indicia of the hazard lights 804, autonomous vehicle 100 may identify vehicle 802 as being in a long-term stationary state. Autonomous vehicle may also determine that vehicle 802 is blocking its pre-determined route of travel. Autonomous vehicle 100 may therefore react to the long-term stationary state of vehicle 802 by altering its route, so as to turn right at intersection 502, rather than proceeding straight through intersection 502.

As described above, autonomous vehicle 100 may determine the stationary state of a detected vehicle using various indicia displayed by the detected vehicle, as well as various traffic control factors relating to the detected vehicle's location and surroundings. These indicia and traffic control factors may be used in any combination to determine the stationary state of a detected vehicle. In some cases a particular set of indicia or traffic control factors may be dispositive, in that the autonomous vehicle will always designate a detected vehicle as being of a particular stationary state when those indicia or traffic control factors exist. In another example, the stationary state of a detected vehicle may be determined probabilistically. In particular, each indicia and traffic control factor may account for some predefined probability in favor of one stationary state or another. The autonomous vehicle may then determine the overall probability of the detected vehicle being in each of the stationary states. The various indicia and traffic control factors may also be weighted differently. For example, the detected vehicle having the driver's side door open may be given three times the weight compared to the displaying of hazard lights by the detected vehicle. The probability of the detected vehicle being in a long-term stationary state may also be adjusted based on whether the autonomous vehicle has previously observed the detected vehicle to have moved. For example, if autonomous vehicle 100 has recently observed movement from a detected vehicle, autonomous vehicle 100 may require additional indicia from a detected vehicle before it is identified as being in a long-term stationary state. The stationary state of a detected vehicle may also be determined based on data from a behavior database regarding how often previously observed vehicles have been in short-term or long-term stationary states, given a particular set of visible indicia and traffic control factors.

Figure 9:
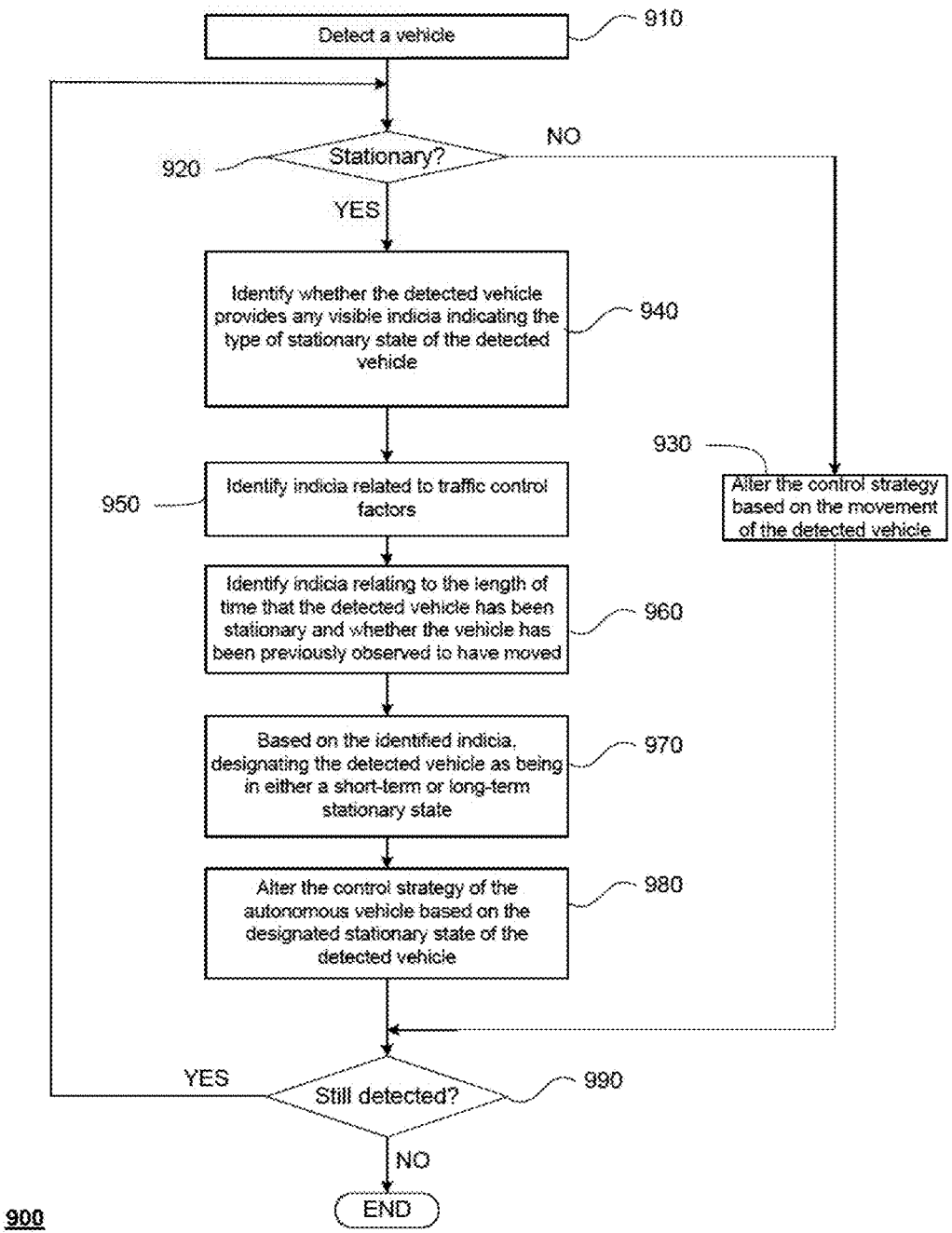
FIG. 9 is an example flow diagram in accordance with aspects of the disclosure.

FIG. 9 is an example flow diagram 900 which depicts some of the aspects described above which may be performed by one or more computing devices, such as one or more computing devices 110, as vehicle 100 is being autonomously controlled in accordance with a control strategy. Flow diagram 900 may also be performed for each vehicle detected by vehicle 100. In this example, autonomous vehicle 100 may detect another vehicle (block 910). It is determined whether the detected vehicle is stationary (block 920). If the detected vehicle is not stationary, autonomous vehicle 100 may alter its control strategy in response to the movements of the detected vehicle (block 930). If the detected vehicle is stationary, the autonomous vehicle 100 may identify whether the detected vehicle is displaying any visible indicia indicating the type of stationary state of the detected vehicle (block 940). As discussed above, the visible indicia may include a determination of whether the detected vehicle is displaying one or more lights, such as hazard lights, turn signals, emergency vehicle lights, brake lights, or reverse lights. In addition, the visible indicia may include a determination of whether a door, trunk, or hood of the detected vehicle is open. The autonomous vehicle may also identify indicia regarding whether any traffic control factors relate to the detected vehicle's stationary state (block 950). For example, as described above, autonomous vehicle 100 may determine if other objects, such as vehicles, pedestrians, or traffic cones, are preventing the detected vehicle from moving. In addition, the autonomous vehicle may identify traffic control factors by accessing map data to determine the type of roadway or intersection at which the detected vehicle is located, including a determination of whether the detected vehicle is located at a traffic light, stop sign, yield sign, or the like.

Autonomous vehicle 100 may also identify the length of time that the detected vehicle has been stationary (block 960). This may include a determination of whether the detected vehicle has previously been observed to have moved. A determination may then be made as to whether the detected vehicle is in a short-term or long-term stationary state (block 970). This determination may be based on one or all of the indicia identified above. Autonomous vehicle 100 may then alter its current control strategy based on the stationary state of the detected vehicle (block 980). For example, autonomous vehicle 100 may move around the detected vehicle, once the detected vehicle has been designated as being in a long-term stationary state. In some instances, altering the control strategy may not require autonomous vehicle 100 to change its path of travel.

As described above, the autonomous vehicle may continue to update its designations of the detected vehicle's stationary state. Autonomous vehicle may therefore determine whether the detected vehicle is still being detected (block 990), and if so, autonomous vehicle 100 may repeat one or more of blocks 920-980. In this way, autonomous vehicle 100 may update the detected vehicle's stationary state designation, as well as the autonomous vehicle's control strategy.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   detecting, by one or more computing devices, a first vehicle;
   identifying, by the one or more computing devices, that the first vehicle is stationary;
   detecting, by the one or more computing devices, one or more visible indicia of the first vehicle, the one or more visible indicia includes lighting being emitted from the first vehicle;
   identifying, by the one or more computing devices, one or more traffic control factors relating to the first vehicle, the one or more traffic control factors including a sign or a road marking in proximity to the first vehicle;
   determining, by the one or more computing devices, whether the first vehicle is in a first stationary state or a second stationary state based on a type of the detected one or more visible indicia and a type of the identified one or more traffic control factors; and
   controlling, by the one or more computing devices, an autonomous vehicle in accordance with a control strategy based on whether the first vehicle is determined to be in the first stationary state or the second stationary state.

2. The method of claim 1, wherein the first stationary state is a short-term stationary state and the second stationary state is a long-term stationary state.

3. The method of claim 2, wherein the first vehicle is determined to be in the second stationary state when the one or more visual indicia includes at least one of the following: hazard lights, emergency vehicle lights, or construction warning lights.

4. The method of claim 1, wherein identifying one or more traffic control factors further comprises detecting that the first vehicle is at a traffic control location associated with being temporarily stationary.

5. The method of claim 2, wherein the first vehicle is determined to be in the first stationary state when the traffic control location relates to the first vehicle being at one of: a traffic light, a stop sign, a yield sign, a caution sign, a crosswalk, or a railroad crossing.

6. The method of claim 4, further comprising:
   detecting, by the one or more computing devices, that the first vehicle has remained stationary for a predetermined period of time; and
   changing, by the one or more computing devices, the determination for the first vehicle from the first stationary state to the second stationary state based on the first vehicle having remained stationary for the predetermined period of time.

7. The method of claim 6, wherein the first vehicle is at a first type of traffic control location from a plurality of traffic control location types, and wherein the predetermined period of time is based on the traffic control location type.

8. The method of claim 1, wherein identifying the one or more traffic control factors further comprises detecting that the first vehicle is temporarily obstructed from moving by one or more surrounding objects.

9. The method of claim 8, wherein at least one object of the one or more surrounding objects is not being detected when the determination is made that the first vehicle is in the first stationary state or the second stationary state, and wherein the first vehicle is determined to be obstructed by the one object based on a previous detection of the one object.

10. A system comprising one or more computing devices configured to:
    detect a first vehicle;
    identify that the first vehicle is stationary;
    detect one or more visible indicia of the first vehicle, the one or more visible indicia includes lighting being emitted from the first vehicle;
    identify, by the one or more computing devices, one or more traffic control factors relating to the first vehicle, the one or more traffic control factors including a sign or a road marking in proximity to the first vehicle;
    determine whether the first vehicle is in a first stationary state or a second stationary state, based on a type of the detected one or more visible indicia and a type of the identified one or more traffic control factors; and
    control an autonomous vehicle in accordance with a control strategy based on whether the first vehicle is determined to be in the first stationary state or the second stationary state.

11. The system of claim 10, wherein the first stationary state is a short-term stationary state and the second stationary state is a long-term stationary state.

12. The system of claim 11, wherein the first vehicle is determined to be in the second stationary state when the one or more visible indicia includes at least one or more of the following: hazard lights, emergency vehicle lights, or construction warning lights.

13. The system of claim 10, wherein identification of the one or more traffic control factors further comprises detection that the first vehicle is at a location associated with being temporarily stationary.

14. The system of claim 11, wherein the first vehicle is determined to be in the first stationary state when the traffic control location relates to the first vehicle being at one of: a traffic light, a stop sign, a yield sign, a caution sign, a crosswalk, or a railroad crossing.

15. The system of claim 13, wherein the one or more computing devices are further configured to:
    detect that the first vehicle has remained stationary for a predetermined period of time; and
    change the determination for the first vehicle from the first stationary state to the second stationary state based on the first vehicle having remained stationary for the predetermined period of time.

16. The system of claim 15, wherein the first vehicle is at a first type of traffic control location from a plurality of traffic control location types, and wherein the predetermined period of time is based on the traffic control location type.

17. The system of claim 10, wherein detecting the one or more indicia includes detecting that the first vehicle is temporarily obstructed from moving by one or more surrounding objects.

18. A computer-implemented method comprising:
- detecting, by one or more computing devices, a first vehicle;
- identifying, by the one or more computing devices, that the first vehicle is stationary;
- detecting, by the one or more computing devices, one or more indicia relating to the first vehicle, the one or more indicia includes lighting being emitted from the first vehicle;
- determining, by the one or more computing devices, whether the first vehicle is in a first stationary state or a second stationary state, based on a type of the detected one or more indicia and a time period for which the first vehicle has been detected to be stationary; and
- controlling, by the one or more computing devices, an autonomous vehicle in accordance with a control strategy based on whether the first vehicle is determined to be in the first stationary state or the second stationary state.

19. The method of claim 18,
- wherein the first stationary state is a short-term stationary state and the second stationary state is a long-term stationary state;
- wherein the first vehicle is determined to be in the first stationary state when the first vehicle is at a traffic control location related to at least one of a traffic light, a stop sign, a yield sign, a caution sign, a crosswalk, or a railroad crossing; and
- wherein the first vehicle is determined to be in the second stationary state when the one or more indicia includes at least one of hazard lights, emergency vehicle lights, or construction warning lights.

* * * * *